(12) United States Patent
Schwagmeyer et al.

(10) Patent No.: US 12,377,829 B2
(45) Date of Patent: Aug. 5, 2025

(54) METHOD FOR CONTROLLING AN ELECTROPNEUMATIC ABS BRAKE SYSTEM IN A TOWING VEHICLE, FUNCTION CONTROL DEVICE AND TOWING VEHICLE

(71) Applicant: ZF CV Systems Europe BV, Brussels (BE)

(72) Inventors: Florian Schwagmeyer, Uetze-Dollbergen (DE); Henrik Wiechert, Springe (DE)

(73) Assignee: ZF CV Systems Europe BV, Brussels (BE)

( * ) Notice: Subject to any disclaimer, the term of this patent is extended or adjusted under 35 U.S.C. 154(b) by 315 days.

(21) Appl. No.: 18/151,799

(22) Filed: Jan. 9, 2023

(65) Prior Publication Data
US 2023/0219547 A1    Jul. 13, 2023

(30) Foreign Application Priority Data
Jan. 7, 2022   (DE) ..................... 10 2022 100 305.1

(51) Int. Cl.
*B60T 8/94*    (2006.01)
*B60T 8/176*   (2006.01)
(Continued)

(52) U.S. Cl.
CPC ............... *B60T 8/94* (2013.01); *B60T 8/176* (2013.01); *B60T 8/34* (2013.01); *B60T 8/885* (2013.01);
(Continued)

(58) Field of Classification Search
CPC . B60T 8/94; B60T 8/176; B60T 8/885; B60T 13/683; B60T 2250/00; B60T 2270/10
(Continued)

(56) References Cited

U.S. PATENT DOCUMENTS

| | | | | |
|---|---|---|---|---|
| 5,132,664 | A | * | 7/1992 | Feldmann ............... B60T 17/22 188/1.11 R |
| 5,295,736 | A | * | 3/1994 | Brearley ................... B60T 7/20 303/118.1 |

(Continued)

FOREIGN PATENT DOCUMENTS

| | | |
|---|---|---|
| DE | 10 2016 010 461 A1 | 3/2018 |
| DE | 10 2017 011 802 A1 | 6/2019 |

(Continued)

*Primary Examiner* — Manglesh M Patel
(74) *Attorney, Agent, or Firm* — Walter Ottesen, P.A.

(57) ABSTRACT

A method is for controlling an ABS brake system. A trailer control pressure is transmittable via a trailer control valve to a trailer to trigger trailer wheel brakes as a function of the trailer control pressure. The trailer control pressure for implementing a stretch brake function or an auxiliary brake function is delivered as a function of a position of an operating element. The method includes: determining a position of the operating element; determining a trailer target pressure as a function of the position; generating and delivering a trailer control pressure corresponding to the trailer target pressure to the control valve; determining an actual towing vehicle deceleration; reading a minimum deceleration associated with the determined position; and triggering brakes of the towing vehicle when the actual deceleration falls below the minimum deceleration read, such that the trailer control pressure does not change and the actual towing vehicle deceleration increases.

20 Claims, 3 Drawing Sheets

(51) Int. Cl.
*B60T 8/34* (2006.01)
*B60T 8/88* (2006.01)
*B60T 13/68* (2006.01)

(52) U.S. Cl.
CPC ......... *B60T 13/683* (2013.01); *B60T 2250/00* (2013.01); *B60T 2270/10* (2013.01)

(58) Field of Classification Search
USPC .................................... 701/70, 78, 83, 110
See application file for complete search history.

(56) References Cited

U.S. PATENT DOCUMENTS

| | | | | |
|---|---|---|---|---|
| 5,333,940 | A * | 8/1994 | Topfer | B60T 8/327 |
| | | | | 303/9.62 |
| 5,738,418 | A * | 4/1998 | Stumpe | B60T 13/683 |
| | | | | 303/15 |
| 5,986,544 | A * | 11/1999 | Kaisers | B60T 13/683 |
| | | | | 280/504 |
| 6,202,018 | B1 * | 3/2001 | Stumpe | B60T 13/662 |
| | | | | 303/20 |
| 6,273,522 | B1 * | 8/2001 | Feetenby | B60T 8/00 |
| | | | | 303/9.69 |
| 8,290,679 | B2 * | 10/2012 | Bensch | B60T 8/327 |
| | | | | 303/3 |
| 9,802,587 | B2 * | 10/2017 | Morselli | B60T 8/171 |
| 9,809,206 | B2 * | 11/2017 | Hummel | B60T 7/20 |
| 11,511,711 | B2 * | 11/2022 | Van Thiel | B60T 13/38 |
| 2005/0017577 | A1 * | 1/2005 | Eckert | B60T 8/1708 |
| | | | | 303/177 |
| 2012/0283925 | A1 * | 11/2012 | Barlsen | B60T 17/22 |
| | | | | 701/70 |
| 2014/0200786 | A1 * | 7/2014 | Morselli | B60T 8/1887 |
| | | | | 701/70 |
| 2014/0343813 | A1 * | 11/2014 | Morselli | B60T 13/686 |
| | | | | 180/14.1 |
| 2015/0336548 | A1 * | 11/2015 | Morselli | B60T 7/20 |
| | | | | 701/70 |
| 2019/0084540 | A1 * | 3/2019 | Kasper | B60T 8/176 |
| 2019/0248346 | A1 | 8/2019 | Wulf | |
| 2019/0270436 | A1 * | 9/2019 | Brütt | B60T 8/1708 |
| 2019/0322256 | A1 * | 10/2019 | Tha | B60T 8/176 |
| 2020/0139950 | A1 * | 5/2020 | James | B60T 13/662 |
| 2020/0156606 | A1 * | 5/2020 | Switkes | G08G 1/22 |
| 2021/0370898 | A1 * | 12/2021 | Eckert | B60T 8/1708 |
| 2024/0198984 | A1 * | 6/2024 | Hauschild | B60Q 5/005 |
| 2025/0108782 | A1 * | 4/2025 | Lacaze | B60W 40/1005 |

FOREIGN PATENT DOCUMENTS

EP 2 108 555 A2 10/2009
EP 2 123 528 A2 11/2009

* cited by examiner

METHOD FOR CONTROLLING AN ELECTROPNEUMATIC ABS BRAKE SYSTEM IN A TOWING VEHICLE, FUNCTION CONTROL DEVICE AND TOWING VEHICLE

CROSS-REFERENCE TO RELATED APPLICATIONS

This application claims priority of German patent application no. 10 2022 100 305.1, filed Jan. 7, 2022, the entire content of which is incorporated herein by reference.

TECHNICAL FIELD

The disclosure relates to a method for controlling an electropneumatic ABS brake system in a towing vehicle, a function control device for carrying out the method, and a towing vehicle, in particular a utility vehicle.

BACKGROUND

To implement a stretch brake function (anti-jackknifing brake function) and a parking brake function, in towing vehicles two operating elements are normally used in addition to the brake pedal in towing vehicles. One operating element is used for stretch braking and the other operating element is used for parking braking, while normal service braking can be carried out via the brake pedal. As an alternative to this, it is also known to use only one operating element, the electrical and pneumatic outputs of which are used for implementing the stretch brake function or the parking brake function, it being possible for this to be used only in electronically controlled EBS brake systems which also have a pressure regulation. Only in this way can a legally required auxiliary brake function be implemented simultaneously in the event of an impairment of the actuation of the service brakes via the brake pedal. In ABS brake systems, on the other hand, such a pressure regulation is not provided, which is why two operating levers have hitherto had to be used, which is more complicated.

US 2019/0248346 provides for the wheel brakes in the trailer to be triggered, that is, for a trailer control pressure to be changed in a targeted manner if an actual acceleration of the towing vehicle does not correspond to a desired target brake effect. DE 10 2017 011 802 A1 also provides for the wheel brakes in the trailer to be triggered, that is, for a trailer control pressure to be changed, if stabilization of the vehicle combination is desired. EP 2 108 555 B1 once again provides for the trailer control pressure to be increased by observing an actual acceleration of the towing vehicle when carrying out a stretch brake function if the brake effect in the towing vehicle is simultaneously suppressed via the respective wheel brakes. Thus, a targeted adaptation of the trailer control pressure takes place in the course of a deceleration regulation. EP 2 123 528 B1 further envisages adapting the triggering of the wheel brakes in the trailer or a delivery of the trailer control pressure as a function of a brake temperature.

SUMMARY

It is an object of the disclosure to provide a method with which, in an ABS brake system of a towing vehicle, different brake functions via the trailer can be represented in a simple and reliable manner. It is also an object of the present disclosure to provide a function control device as well as a towing vehicle.

This object is, for example, achieved by various methods, function control devices and towing vehicles according to the disclosure.

Accordingly, according to the disclosure, a method is provided for controlling an electropneumatic ABS brake system in a towing vehicle with a trailer control valve, wherein a trailer control pressure generated in the towing vehicle can be transmitted via the trailer control valve to a trailer coupled to the towing vehicle in order to trigger wheel brakes of the trailer as a function of the trailer control pressure, wherein the trailer control pressure for implementing a stretch brake function (extension of the combination of towing vehicle and trailer) or an auxiliary brake function (auxiliary braking of the vehicle in the event of impaired actuation of the brake valve/brake pedal) is delivered as a function of a setting position of a (single) manually actuatable operating element, which preferably differs from the brake valve/brake pedal of the towing vehicle, with at least the following steps:

determining a setting position of the operating element, for example via a corresponding position sensor;

determining a trailer target pressure as a function of the determined setting position of the operating element, in particular from stored characteristic curves;

generating a trailer control pressure corresponding to the trailer target pressure and delivering the trailer control pressure to the trailer control valve in order to implement braking by the trailer according to the setting position;

determining an actual deceleration of the towing vehicle, at least when the stretch brake function is activated, that is, a stretch braking is to be brought about by braking the trailer via the operating element, the actual deceleration preferably being determined only when the stretch brake function is activated in order to save computer capacities;

reading a minimum deceleration for the towing vehicle associated with the determined setting position, in particular from a third characteristic curve which associates a minimum deceleration with the determined setting position; and triggering the wheel brakes of the towing vehicle when the actual deceleration falls below the minimum deceleration read, in such a way that the trailer control pressure delivered to the trailer control valve does not change and the actual deceleration of the towing vehicle increases.

Advantageously, therefore, a deceleration regulation is proposed in which the brake effect on the trailer does not change. The predetermined trailer control pressure is thus further maintained as a function of the actuation of the operating element or as a function of the setting position. An excessively low brake effect (actual deceleration<minimum deceleration) is then brought about merely by the wheel brakes in the towing vehicle being acted upon, preferably in such a way that the actual deceleration of the towing vehicle reaches or exceeds the minimum deceleration.

This advantageously has the result that, in the case of a stretch braking and, under certain circumstances, also in the case of auxiliary braking, which are carried out only via the wheel brakes on the trailer, a certain minimum deceleration can be ensured if, in fact, no trailer is present or its brake effect is impaired. The difference from the minimum deceleration can then at least be compensated for by triggering the wheel brakes in the towing vehicle. This is particularly the case in electropneumatically controlled ABS brake systems in which no monitoring of a coupled trailer takes place or communication between the ABS control units in the towing vehicle and trailer is disturbed, so that it is not possible to reliably determine whether a trailer is coupled or whether it can be triggered correctly. In this case, the compensated triggering of the wheel brakes in the towing vehicle makes it possible to reach in a simple and reliable manner a lack of brake effect which is specifically requested by the driver by the setting position for auxiliary braking.

For this purpose, the triggering of the wheel brakes in the towing vehicle (at zIst<zMin) can take place, for example, in such a way that ABS brake valves, which are connected upstream of the wheel brakes of the towing vehicle in the ABS brake system (separately or as a component of an axle modulator), are electrically actuated in order to modulate a brake pressure conveyed to the wheel brakes in accordance with the lack of brake effect. For this purpose, an increased control pressure, in particular a supply pressure from the pressure reservoirs, can be conveyed to the valve units (for example relay valve or axle modulator) associated with the vehicle axles, which supply pressure is then correspondingly reduced or adapted by the ABS brake valves in order to implement the absent brake effect during the deceleration regulation if the driver intends to apply auxiliary braking. Advantageously, therefore, recourse is made to components already present in the vehicle in order to achieve this.

Preferably, it is further provided that the determination of the actual deceleration of the towing vehicle and/or the triggering of the wheel brakes of the towing vehicle when the actual deceleration falls below the minimum deceleration read is carried out only when the stretch brake function is activated. This is intended to ensure that an auxiliary brake function which is normally suppressed in the stretch braking mode is available in a similar manner, that is, the vehicle can nevertheless be braked when the stretch braking is activated and the trailer is not present or impaired if this is no longer possible reliably via the brake pedal or the brake valve.

Preferably, it is further provided that the determination of the actual deceleration of the towing vehicle and/or the triggering of the wheel brakes of the towing vehicle when the actual deceleration falls below the minimum deceleration read is carried out only when the setting position additionally exceeds a minimum setting position, for example a minimum setting position of 70%. This takes account of the fact that the driver normally wants to reach a very high brake effect via the auxiliary brake function and accordingly also actuates the operating element to a stronger extent. On the other hand, below the minimum setting position of the operating element, it is rather not to be expected that the driver would like to implement an auxiliary brake function, but is merely interested in extending the vehicle combination, for which reason the determination and evaluation of the actual deceleration of the towing vehicle is not necessary. As a result, computer capacities can additionally be waived.

Preferably, it can also be provided that the wheel brakes of the towing vehicle are triggered when the stretch brake function is activated only when the actual deceleration falls below the minimum deceleration read. This ensures that the wheel brakes in the towing vehicle are triggered only when this is required during deceleration regulation, in particular while driving, when the driver intends to apply auxiliary braking. In the event that it is necessary or advisable from the standpoint of driving dynamics to give the driver full control over all wheel brakes, that is, also the wheel brakes on the front axle, when the stretch brake function is activated, a targeted suppression of the stretch brake function can also be provided. In this case, suitable measures are taken for safety reasons, so that when the brake valve/brake pedal is actuated by the driver, the driver's wish can be reliably implemented on all wheel brakes.

Preferably, it is further provided that the trailer target pressure:
- is determined from a first characteristic curve when the stretch brake function is activated in order to implement the stretch brake function when the operating element is actuated, and
- is determined from a second characteristic curve when the stretch brake function is deactivated in order to implement the auxiliary brake function when the operating element is actuated,
- wherein the first characteristic curve and the second characteristic curve each associate a trailer target pressure with a setting position of the operating element, for example in a linear or a non-linear characteristic curve. A separation therefore takes place, so that the stretch braking can be parameterized independently of the auxiliary braking. At the same time, the auxiliary brake function, which is implemented in accordance with the second characteristic curve, is suppressed when the stretch braking, which is implemented in accordance with the first characteristic curve, is active.

Preferably, it is further provided that the stretch brake function and the auxiliary brake function are implemented on actuation of the operating element only when the towing vehicle is moving, and otherwise a parking brake function is implemented on actuation of the operating element, wherein the parking brake function is implemented by the vehicle brakes of the towing vehicle being triggered, in particular via a parking brake valve, actuation of the parking brake valve being suppressed when the stretch brake function is activated. The operating element can therefore be used for a series of brake functions, the corresponding logic behind this, in particular the deceleration regulation, ensuring in a simple manner that the respective brake functions are available in the respective driving situation in order to increase driving safety.

Preferably, it is further provided that the setting position of the operating element and/or an activation of the stretch brake function via a switch are read from a vehicle data bus. As a result, the system can be easily retrofitted and the respective information can also be made available to other vehicle systems in a simple manner.

Preferably, it is further provided that a trailer control pressure corresponding to the trailer target pressure is generated in order to implement the stretch brake function and/or the auxiliary brake function by virtue of the fact that an adjusting valve is electrically actuated in an additional line leading to the trailer control valve, wherein a supply pressure supplied to the adjusting valve via a valve device, in particular a 3/2-way valve, from an additional pressure reservoir is modulated by the electrical actuation of the adjusting valve in such a way that a trailer control pressure corresponding to the trailer target pressure is delivered. Accordingly, an adaptation of the pressure from the pressure medium supply takes place in a simple manner in order to achieve the brake effect on the trailer in connection with the stretch brake function or the auxiliary brake function. For this purpose, the adjusting valve can have, for example, a combination of an inlet valve and an outlet valve in order to modulate the pressure in a simple manner comparably to an ABS brake valve.

In this case, an electropneumatic ABS brake system can be used, in which, preferably by actuating a brake valve of the ABS brake system in the towing vehicle, an actuation-dependent control pressure is provided both for the rear axle of the towing vehicle and for the front axle of the towing vehicle, wherein via a valve unit on the front axle of the towing vehicle, for example via an axle modulator, and, when the stretch brake function is deactivated and the auxiliary brake function is not implemented, also via a valve unit on the front axle of the towing vehicle, for example via an air-quantity-boosting relay valve, a brake pressure dependent on the respective control pressure is delivered to the wheel brakes on the rear axle of the towing vehicle and also to the wheel brakes on the front axle respectively in the towing vehicle when the stretch brake function is deactivated, ABS brake valves being connected upstream of each of the wheel brakes (separately or as a component of the axle modulator) for modulating the delivered brake pressure, in particular in connection with a drive slip/brake slip regulation. In the event that the wheel brakes of the front axle and/or of the rear axle are to be acted upon by a corresponding brake pressure as part of the deceleration regulation (when the stretch brake function is activated), the brake pressure respectively provided from the pressure reservoir of the front axle or of the rear axle can be modulated via these ABS brake valves.

The disclosure also provides an ABS control device for a towing vehicle having an electropneumatic ABS brake system, in particular for carrying out the method according to the disclosure, and also a towing vehicle having the ABS control device, the ABS control device being adapted:
 to determine a setting position of an operating element;
 to determine a trailer target pressure as a function of the determined setting position of the operating element;
 to output an adjusting valve signal to an adjusting valve in such a way that a trailer control pressure corresponding to the trailer target pressure can be generated and delivered via an additional line to the trailer control valve of the ABS brake system, where the trailer control pressure generated can be transmitted via the trailer control valve to a trailer coupled to the towing vehicle in order to trigger wheel brakes of the trailer in order to implement a stretch brake function or an auxiliary brake function as a function of the trailer control pressure;
 to determine an actual deceleration of the towing vehicle, at least when a stretch brake function is activated;
 to read a minimum deceleration for the towing vehicle associated with the determined setting position; and
 to trigger wheel brakes of the towing vehicle in such a way that the trailer control pressure delivered to the trailer control valve does not change and the actual deceleration of the towing vehicle increases when the actual deceleration falls below the minimum deceleration read.

BRIEF DESCRIPTION OF DRAWINGS

The invention will now be described with reference to the drawings wherein.

DETAILED DESCRIPTION

Figure 1:
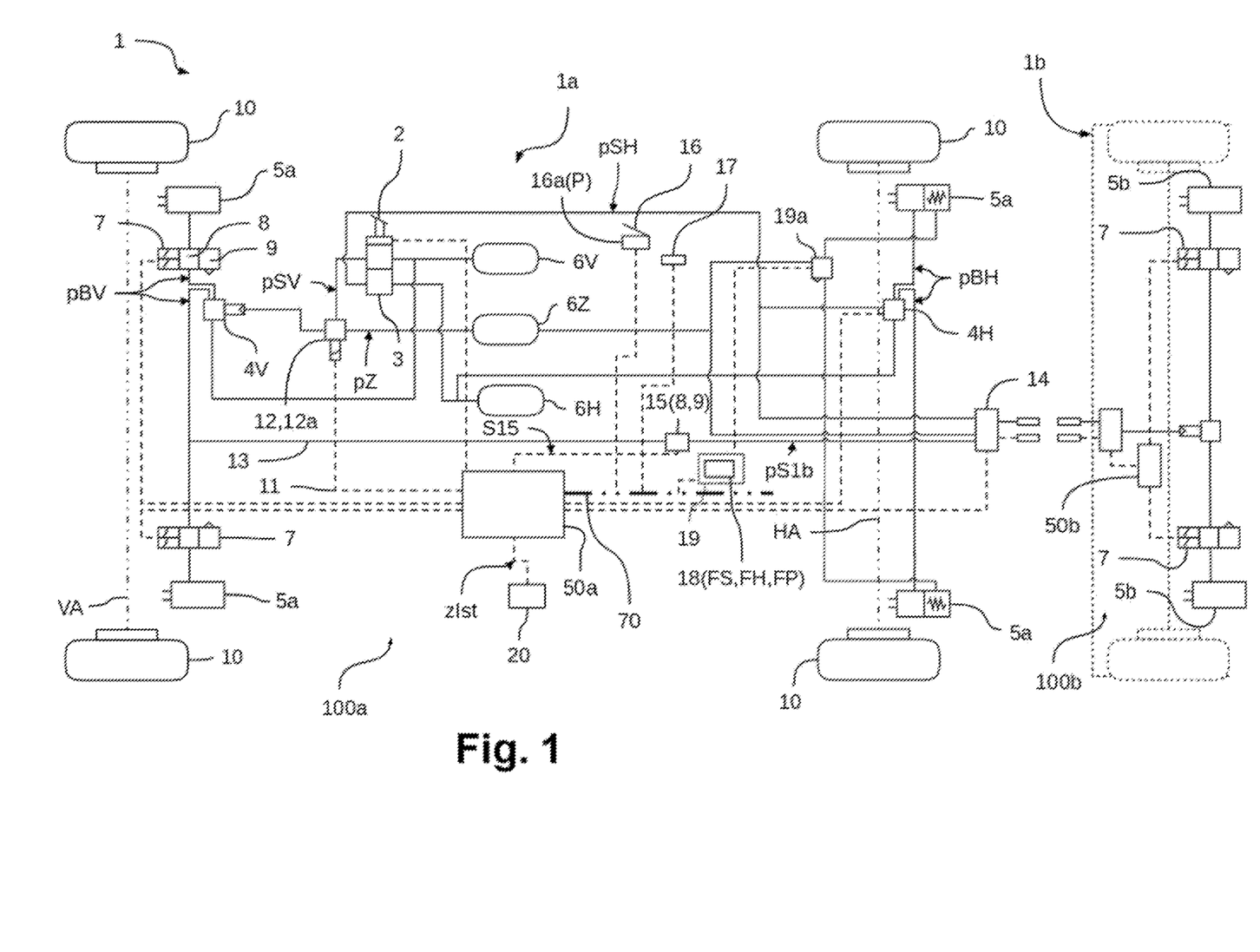
FIG. 1 shows a schematic view of an ABS brake system of a vehicle having a towing vehicle and a trailer.

FIG. 1 depicts a vehicle having a towing vehicle 1a and a trailer 1b, an electropneumatically controllable ABS brake system 100a, 100b being provided both in the towing vehicle 1a and in the trailer 1b. An actuation-dependent control pressure pSV, pSH can be output via a brake pedal 2 of an electropneumatic brake valve 3 (2-circuit) to valve units 4V, 4H, which are associated with a front axle VA and a rear axle HA of the towing vehicle 1a. The valve units 4V, 4H then deliver a brake pressure pBV, pBH corresponding to the control pressure pSV, pSH to the wheel brakes 5a on the front axle VA or on the rear axle HA of the towing vehicle 1a. The valve units 4V, 4H can, for example, be air-quantity-boosting relay valves or have such valves, the air-quantity boosting taking place via pressure reservoirs 6V, 6H which are associated with the front axle VA or the rear axle HA.

For brake slip-regulated braking, the ABS brake system 100a in the towing vehicle 1a also has an ABS control device 50a which electrically actuates ABS brake valves 7 respectively located upstream of the wheel brakes 5a of the towing vehicle 1a, the ABS brake valves 7 each including a combination of an inlet valve 8 and an outlet valve 9. The ABS brake valves 7 of the rear axle HA are integrated in the valve unit 4H (axle modulator), which is associated with the rear axle HA. As a function of a detected brake slip of the respective wheel 10, the respective ABS brake valves 7 can be triggered in a pulsed manner for each individual wheel in order to maintain or reduce the brake pressure pBV, pBH delivered to the wheel brakes 5a of the respective vehicle axle VA, HA of the towing vehicle 1a. This brake slip regulation can take place for each individual wheel. A comparable brake slip regulation is also provided in the trailer 1b, this being carried out via an ABS control device 50b in the trailer 1b, with corresponding ABS brake valves 7 which are connected upstream of the wheel brakes 5b in the trailer 1b.

The ABS control device 50a in the towing vehicle 1a is also connected via an electrical line 11 to a valve device 12, preferably a 3/2-way valve 12a, the valve device 12 selectively delivering, depending on the switching position, either the control pressure pSV, delivered by the brake valve 3, for the front axle VA or a supply pressure pZ (for example 8.5 bar) of an additional reservoir 6Z to the valve unit 4V of the front axle VA. The brake pressure pBV at the wheel brakes 5a of the front axle VA can thus optionally also be increased if the valve device 12 delivers the supply pressure pZ in the respective switching position. As a result, other brake functions can also be implemented in the towing vehicle 1a via the ABS control device 50a.

In the embodiment described, however, this serves primarily to introduce the supply pressure pZ of the additional reservoir 6Z into an additional line 13 which is likewise connected to the valve unit 4V of the front axle VA and leads to a trailer control valve 14. In addition, an electrically controllable adjusting valve 15 is arranged in the additional line 13, which adjusting valve, comparably to an ABS brake valve 7, has a combination of an inlet valve 8 and an outlet valve 9, so that the supply pressure pZ introduced into the additional line 13 can be maintained or continuously reduced. As a result, an individually modulated trailer control pressure pS1b can be supplied to the trailer control valve 14 in order to be able to implement a stretch brake function FS, a parking brake function FP or an auxiliary brake function FH in the vehicle 1 as described below.

In the ABS brake system 100a of the towing vehicle 1a, a manually actuatable operating element 16, for example a continuously adjustable (between 0% and 100%) lever, with a position sensor 16a, a switch 17 and a function control device 18 are also provided for this purpose, each of which is connected to a vehicle data bus 70, for example a CAN data bus. The stretch brake function FS, the auxiliary brake function FH and a parking brake function FP can be implemented in the vehicle 1 via the function control device 18, the function control device 18 deciding in particular in situ which of the functions (FS, FH, FP) is to be or may be activated. The function control device 18 can be a component of a parking brake control unit 19, for example, or can be formed by the latter.

When the vehicle 1 is at a standstill and the parking brake function FP is activated, the parking brake control unit 19 or the function control device 18 can ensure that the vehicle 1 is held permanently securely, for example also on an incline or on a slope. For this purpose, the parking brake control unit 19 or the function control device 18 can electrically actuate a parking brake valve 19a when the vehicle 1 is at a standstill, which valve in turn has the effect, by pneumatic triggering, that spring-loaded brake cylinders are applied in the wheel brakes 5a on the rear axle HA of the towing vehicle 1a, the spring-loaded brake cylinders subsequently being mechanically secured. At the same time, when the vehicle 1 is at a standstill and the parking brake function FP is activated, the parking brake control unit 19 or the function control device 18 can also ensure that the trailer 1b is braked, a corresponding trailer control pressure pS1b being delivered to the trailer control valve 14 for this purpose, as will be described below.

The stretch brake function FS serves to extend the vehicle 1 while driving, that is, to brake the trailer 1b more strongly than the towing vehicle 1a in certain situations in order to avoid stability-critical situations while driving. The auxiliary brake function FH also ensures that the vehicle 1 can be braked securely while driving even if actuation of the brake valve 3 is prevented or impaired, that is, the vehicle 1 can no longer be decelerated as desired by manual actuation of the brake pedal 2 by the driver.

The control of the individual functions FH, FS, FP is effected in each case via the operating element 16, it being necessary for the function control device 18 to decide correspondingly which of the functions FH, FS, FP is to be implemented in the respectively present situation. This is done according to the following criteria:

in order to activate or deactivate the stretch brake function FS, the switch 17 must be brought into the corresponding position by the driver. The position of the switch 17 can be read by the function control device 18 or the parking brake control unit 19 via the vehicle data bus 70, so that the latter can also determine whether a stretch brake function FS is desired or not. The latter can then decide whether the stretch brake function FS may be activated and can also communicate this to the ABS control device 50a in the towing vehicle 1a, for example via the vehicle data bus 70.

Figure 2:
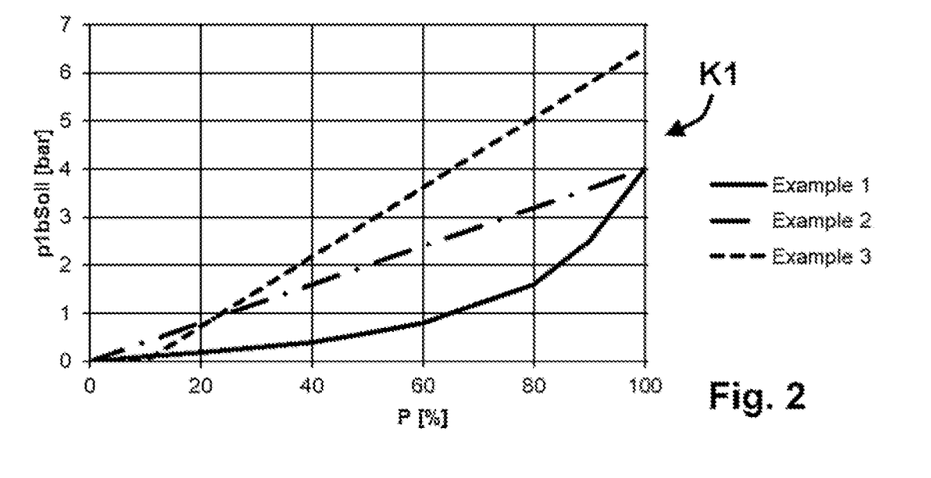
FIG. 2 shows a first characteristic curve for implementing a stretch brake function.

If the stretch brake function FS is activated via the switch 17 during the travel of the vehicle 1 and if the function control device 18 allows such a stretch brake function FS to be implemented, the ABS control device 50a in the towing vehicle 1a determines a trailer target pressure p1bSoll as a function of a setting position P (between 0% and 100%) of the operating element 16. For this purpose, the ABS control device 50a in the towing vehicle 1a is connected via the vehicle data bus 70 both to the operating element 16 and to the switch 17. The setting position P is thus determined via the position sensor 16a, which detects, for example, a path or an angle of the continuously adjustable lever of the operating element 16 and outputs it to the vehicle data bus 70. Via a first characteristic curve K1, which is shown by way of example in FIG. 2, the trailer target pressure p1bSoll can be determined from the setting position P, which is plotted in the first characteristic curve K1, for example, between 0% (unactuated) and 100% (fully actuated). The first characteristic curve K1 can be stored in a parameterizable manner in the ABS control device 50a.

Subsequently, based on the determined trailer target pressure p1bSoll, the adjusting valve 15 is electrically actuated by the ABS control device 50a via an adjusting valve signal S15, for this purpose use being made of the stored and previously determined valve characteristic curves for the inlet valve 8 and the outlet valve 9 of the adjusting valve 15, from which the actuation times for the inlet valve 8 or the outlet valve 9 follow in order to reach the trailer target pressure p1bSoll. This is preferably carried out taking into account the supply pressure pZ prevailing in the additional line 13. Subsequently, the trailer target pressure p1bSoll is thus ideally delivered as trailer control pressure pS1b to the trailer control valve 14 in order to brake the trailer 1b accordingly in connection with the stretch brake function FS.

Since for the pressurization of the additional line 13 in connection with the stretch brake function FS the valve device 12 is switched over via the ABS control device 50a in such a way that the supply pressure pZ of the additional supply container 6Z is delivered to the valve unit 4V of the front axle VA, during a stretch braking no braking of the vehicle 1 via the wheel brakes 5a on the front axle VA of the towing vehicle 1a is possible by the driver via the control pressure pSV delivered by the brake valve 3. However, the wheel brakes 5a on the rear axle HA of the towing vehicle 1a remain under the control of the driver (via the valve unit 4H (axle modulator) on the rear axle HA).

When the stretch brake function FS is deactivated (corresponding position of the switch 17), the auxiliary brake function FH can be implemented by a corresponding actuation of the operating element 16 through the driver, this taking place in a manner comparable to the stretch brake function FS, insofar as the function control device 18 allows the auxiliary brake function FH to be implemented. Based on the setting position P of the operating element 16 determined by the position sensor 16a, a trailer target pressure p1bSoll is likewise determined for this purpose by the ABS control device 50a. Subsequently, the trailer target pressure p1bSoll to be delivered for the auxiliary brake function FH is determined via a second characteristic curve K2, which is shown by way of example in FIG. 3, from the setting position P, which is plotted between 0% (unactuated) and 100% (fully actuated). The second characteristic curve K2 can also be stored in a parameterizable manner in the ABS control device 50a.

Subsequently, based on the determined trailer target pressure p1bSoll, the adjusting valve 15 is electrically actuated by the ABS control device 50a via an adjusting valve signal S15, taking into account the valve characteristic curves for the inlet valve 8 and the outlet valve 9, in order to generate the trailer target pressure p1bSoll and to deliver it to the trailer control valve 14 and thereby to implement the auxiliary braking desired by the driver (solely) by braking the trailer 1b.

Figure 3:
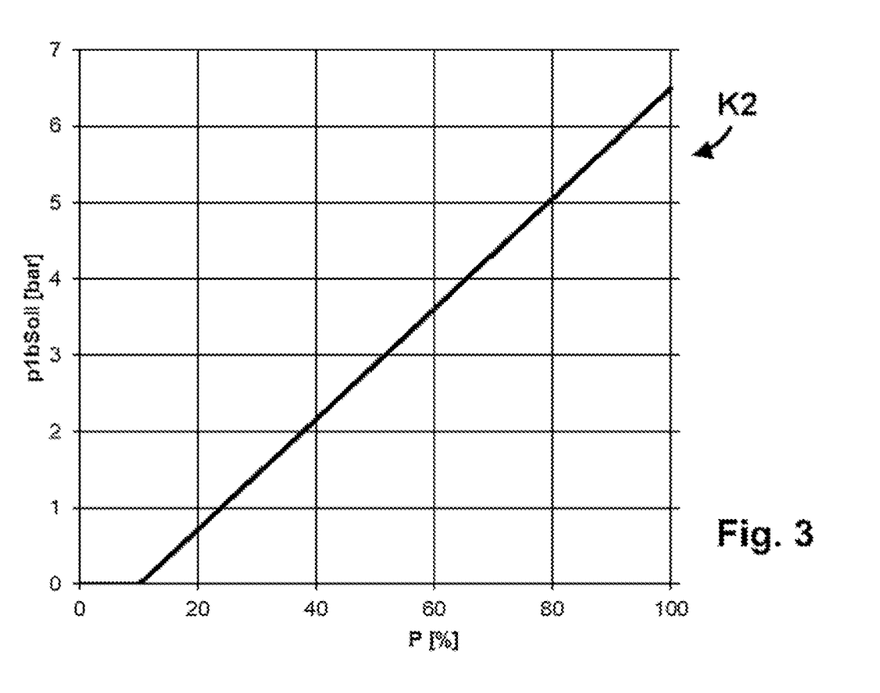
FIG. 3 shows a second characteristic curve for implementing an auxiliary brake function; and,
FIG. 4 shows a third characteristic curve for monitoring an actual deceleration of the towing vehicle.

According to an optional embodiment, when the stretch brake function FS is deactivated and the auxiliary brake function FH is activated (and permitted), the parking brake valve 19a can additionally be electrically actuated by the parking brake control unit 19 so that, when the operating element 16 is actuated by the driver, the auxiliary brake function FH while driving can be achieved by additional braking of the vehicle 1 via the spring-loaded brake cylinders on the towing vehicle 1a. For this purpose, the second characteristic curve K2 is to be defined in the ABS control device 50a in such a way that approximately the same brake effect is achieved via the trailer target pressure p1bSoll, which is then delivered, as via the spring-loaded brake cylinders in the towing vehicle 1a in order not to extend or compress the train unnecessarily. In order to avoid critical driving situations, if, for example, the trailer 1b cannot be braked as described above by actuating the adjusting valve 15 in connection with the auxiliary brake function FH, additional safety routines may have to be implemented.

If the stretch brake function FS is activated while driving, such pneumatic triggering of the spring-loaded brake cylinders in the towing vehicle 1a via the parking brake valve 19a and also an implementation of the auxiliary brake function FH via the adjusting valve 15 is suppressed, as described above, in that the function control device 18 correspondingly suppresses or does not permit this. Only when the vehicle 1 is at a standstill and the parking brake function FP is requested by actuation of the operating element 16 can the parking brake valve 19a or the spring-loaded brake cylinder in the towing vehicle 1a and, if appropriate, also the adjusting valve 15 for trailer braking be triggered independently of activation of the stretch brake function FS, but then only in connection with the parking brake function FP, via which the vehicle 1 is to be held securely at a standstill. When the parking brake function FP is activated, this can be defined accordingly by the function control device 18 and, if appropriate, also communicated to the ABS control device 50a, so that a corresponding implementation can take place.

For the stretch brake function FS and the auxiliary brake function FH, a targeted suppression of the corresponding triggering, for example by the ABS control device 50a in the towing vehicle 1a, can also be envisaged if it is necessary or advisable from the standpoint of driving dynamics to give the driver full control over all the wheel brakes 5a in the towing vehicle 1a, that is, also the wheel brakes 5a on the front axle VA, even when the stretch brake function FS or auxiliary brake function FH is activated. In this case, suitable measures are taken for safety reasons, so that when the brake valve 3 or the brake pedal 2 is actuated by the driver, the driver's wish can be reliably implemented at all wheel brakes 5a of the towing vehicle 1a. Such a suppression can also be provided for the case in which it is signaled via the ABS control device 50a, 50b in the towing vehicle 1a or in the trailer 1b, for example via the vehicle data bus 70, that an ABS regulation at the wheels 10 of the towing vehicle 1a and/or of the trailer 1b is active.

In order to ensure that in the case of a stretch brake function FS activated via the switch 17 braking of the vehicle 1 corresponding to the auxiliary brake function FH can nevertheless be made possible, for example if, when the stretch brake function FS is activated, no trailer 1b is actually coupled to the towing vehicle 1a or the desired braking cannot be achieved via the latter, the disclosure additionally provides for monitoring of an actual deceleration zIst (negative actual acceleration) of the towing vehicle 1a. The fact that no trailer 1b is actually coupled or the trailer cannot provide the desired braking performance cannot always be reliably determined by the present ABS brake system 100a in the towing vehicle 1a, for example if such function monitoring is not provided, since the ABS brake system 100b in the trailer 1b is not configured, for example, for this purpose, or communication between the two ABS control devices 50a, 50b does not function.

Thus, if the stretch brake function FS is activated and, consequently, the abovementioned auxiliary brake function FH is suppressed by the function control device 18 via the adjusting valve 15 (trailer braking) and, if appropriate, by the parking brake valve 19a (towing vehicle braking) and, at the same time, actuation of the brake valve 3 is prevented or impaired, that is, the vehicle 1 can no longer be decelerated as desired by the driver by manual actuation of the brake pedal 2, the additional monitoring of the actual deceleration zIst of the towing vehicle 1a also continues to permit or ensure sufficient auxiliary braking of the vehicle 1 as follows:

For this purpose, the ABS control device 50a in the towing vehicle 1a evaluates on the basis of a third characteristic curve K3 (see FIG. 4) whether the measured actual deceleration zIst of the towing vehicle 1a has reached or exceeded a minimum deceleration zMin associated with the current setting position P of the operating element 16. This test is carried out with a time delay with respect to the actuation of the operating element 16 in order to take into account the response behavior of the wheel brakes 5b of the trailer 1b in the presence of an stretch braking.

Figure 4:
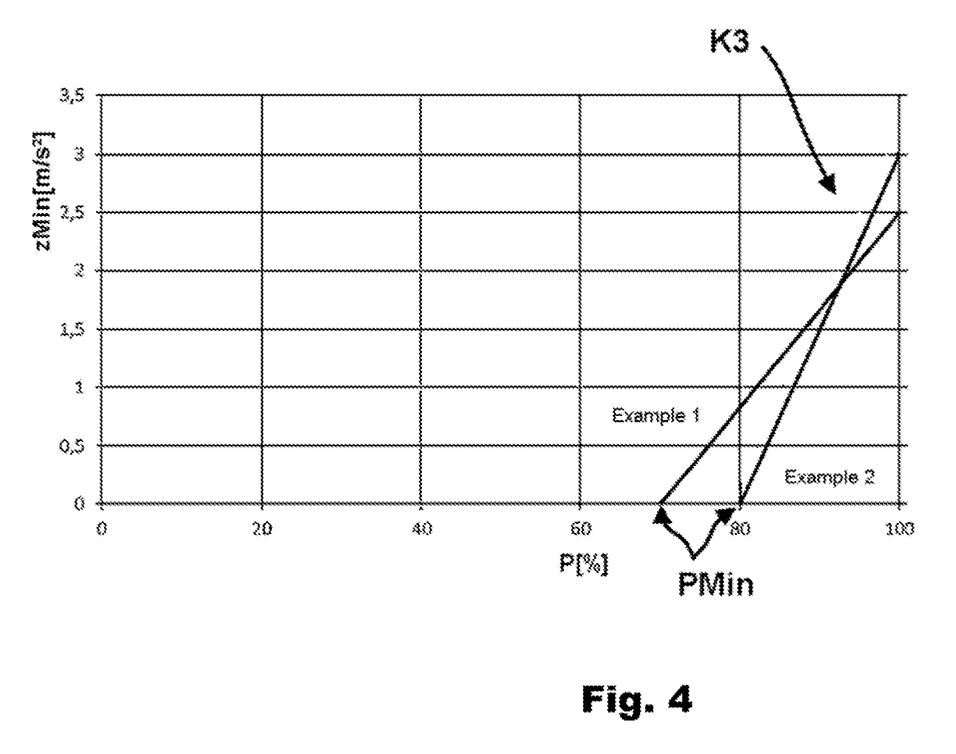

The actuation-dependent trend of the minimum deceleration zMin can be parameterized in this case, the minimum deceleration zMin preferably differing from zero only starting from a defined minimum setting position PMin of the operating element 16. If the driver uses the operating element 16, when the stretch brake function FS is activated, to implement an auxiliary brake function FH, it is to be expected that they will move the operating element 16 at least up to the respective minimum setting position PMin, for example 70% or 80%, or a value therebetween. The monitoring of the actual deceleration zIst of the towing vehicle 1a can or could therefore in fact also only begin when this minimum setting position PMin is reached, and monitoring before that can be dispensed with in order to save computer capacities. Starting from the minimum setting position PMin, the minimum deceleration zMin increases linearly with an increasing setting position P in the embodiment shown. The minimum deceleration zMin at a setting position P of 100% is at least 2.2 m/s$^2$, in the examples shown 2.5 m/s$^2$ or 3 m/s$^2$, in particular to meet legal requirements for the auxiliary brake function FH.

If the actual deceleration zIst of the towing vehicle 1a reaches or exceeds the minimum deceleration zMin for the respective setting position P, it can be assumed that a trailer 1b is coupled and the triggering of the wheel brakes 5b in the trailer 1b functions correspondingly when the stretch brake function FS is activated. The driver is thus able to brake the entire vehicle 1 including towing vehicle 1a and trailer 1b in accordance with their wish, even if actuation of the brake valve 3 is prevented or impaired, that is, the vehicle 1 can no longer be decelerated as desired by manual actuation of the brake pedal 2 by the driver.

However, if the actual deceleration zIst of the towing vehicle 1a falls below the minimum deceleration zMin for the respective setting position P, an impairment can be assumed which prevents the driver from achieving braking of the vehicle 1 as part of an auxiliary brake function FH when the stretch brake function FS is activated. In this case (zIst<zMin (P)), the ABS control device 50a additionally ensures that the wheel brakes 5a in the towing vehicle 1a are also triggered without influencing the brake effect in the trailer 1b (if any), that is, without changing the trailer control pressure pS1b delivered to the trailer control valve 14.

Additional braking of the towing vehicle 1a thus at least partially compensates for the brake effect which is absent from the trailer 1b or is inadequate or is not present (if there is no trailer 1b). This ensures that the vehicle 1 can also be braked by actuation of the operating element 16 in the event that the driver wishes for auxiliary braking when the stretch brake function FS is activated but the trailer 1b is absent or impaired because braking via the brake valve 3 is not possible. The wheel brakes 5a in the towing vehicle 1a are triggered here, for example, in such a way that the actual deceleration zIst of the towing vehicle 1a reaches or exceeds the minimum deceleration zMin for the respective setting position P.

In this case, proportioned triggering of the wheel brakes 5a in the towing vehicle 1a by the ABS control device 50a can be effected, for example, in that the ABS control device 50a in the towing vehicle 1a triggers the ABS brake valves 7 on the front axle VA of the towing vehicle 1a in such a way that the brake pressure pBV, applied by the valve device 12 or the 3/2-way valve 12a, on the front axle VA of the towing vehicle 1a is correspondingly modulated (when the stretch brake function FS is activated). At the rear axle HA of the towing vehicle 1a, the ABS brake valves 7 and a corresponding valve device or a 3/2-way valve are integrated in the valve unit 4H (axle modulator) of the rear axle HA, so that a corresponding modulation of the supply pressure supplied to the valve unit 4H from the pressure reservoir 6H of the rear axle HA can also take place there. As a result, the actual deceleration zIst of the towing vehicle 1a can be adapted accordingly in order to achieve the minimum deceleration zMin.

In order to be able to make use of a reliably determined value in the additional monitoring of the actual deceleration zIst of the towing vehicle 1a, it is additionally provided that the ABS control device 50a makes use of signals of an ESC module 20 which is connected, for example, to the ABS control device 50a (directly or via the vehicle data bus 70). In the ESC module 20, the actual deceleration zIst can be determined exactly, possibly adjusted for a slope or an incline on which the towing vehicle 1a is located, so that the braking of the towing vehicle 1a or the comparison with the minimum deceleration zMin can likewise take place more accurately or more reliably. However, it can also be provided that the actual deceleration zIst of the towing vehicle 1a (in the longitudinal direction with respect to the roadway) is determined or estimated via a separate acceleration sensor and a separate inclination sensor.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Vehicle
1a Towing vehicle
1b Trailer
2 Brake pedal
3 Brake valve
4H Valve unit of the rear axle HA
4V Valve unit of the front axle VA
5a Wheel brakes of the towing vehicle 1a
5b Wheel brakes of the trailer 1b
6V Pressure reservoir of the front axle VA
6H Pressure reservoir of the rear axle HA
6Z Additional pressure reservoir
7 ABS brake valves
8 Inlet valve
9 Outlet valve
10 Wheel
11 Electrical line
12 Valve device
12a 3/2-way valve
13 Additional line
14 Trailer control valve
15 Adjusting valve
16 Operating element
16a Position sensor
17 Switch
18 Function control device
19 Parking brake control unit
19a Parking brake valve
20 ESC module
50a ABS control device in the towing vehicle 1a
50b ABS control device in the trailer 1b
70 Vehicle data bus
100a ABS brake system in the towing vehicle 1a
100b ABS brake system in the trailer 1b
FH Auxiliary brake function
FP Parking brake function
FS Stretch brake function
HA Rear axle of the towing vehicle 1a
K1 First characteristic curve
K2 Second characteristic curve
K3 Third characteristic curve
P Setting position of the operating element 16
p1bSoll Trailer target pressure
pBH Brake pressure on the rear axle HA of the towing vehicle 1a
pBV Brake pressure on the front axle VA of the towing vehicle 1a
PMin Minimum setting position
pS1b Trailer control pressure
pSH Control pressure for the rear axle HA of the towing vehicle 1a
pSV Control pressure for the front axle VA of the towing vehicle 1a
pZ Supply pressure of the additional pressure reservoir 6Z
S15 Adjusting valve signal
VA Front axle
zIst Actual deceleration of the towing vehicle 1a
zMin Minimum deceleration

The invention claimed is:

1. A method for controlling an electropneumatic anti-lock braking system (ABS) in a towing vehicle with a trailer control valve, wherein a trailer control pressure generated in the towing vehicle is transmittable via the trailer control valve to a trailer coupled to the towing vehicle in order to trigger wheel brakes of the trailer as a function of the trailer control pressure, wherein the trailer control pressure for implementing a stretch brake function or an auxiliary brake function is delivered as a function of a setting position of a manually actuatable operating element, the method comprising:
determining a setting position of the operating element;
determining a trailer target pressure as a function of the determined setting position of the operating element;

generating the trailer control pressure corresponding to the trailer target pressure and delivering the trailer control pressure to the trailer control valve;

determining an actual deceleration of the towing vehicle, at least when the stretch brake function is activated;

reading a minimum deceleration for the towing vehicle associated with the determined setting position; and, triggering the wheel brakes of the towing vehicle when the actual deceleration falls below the minimum deceleration read such that the trailer control pressure delivered to the trailer control valve does not change and the actual deceleration of the towing vehicle increases.

2. The method of claim 1, wherein at least one of said determination of the actual deceleration of the towing vehicle and said triggering of the wheel brakes of the towing vehicle when the actual deceleration falls below the minimum deceleration read is carried out only when the stretch brake function is activated.

3. The method of claim 1, wherein at least one of said determination of the actual deceleration of the towing vehicle and said triggering of the wheel brakes of the towing vehicle when the actual deceleration falls below the minimum deceleration read is carried out only when the setting position exceeds a minimum setting position.

4. The method of claim 3, wherein the minimum setting position is 70%.

5. The method of claim 1, wherein the wheel brakes of the towing vehicle are triggered when the stretch brake function is activated only when the actual deceleration falls below the minimum deceleration read.

6. A method for controlling an electropneumatic anti-lock braking system (ABS) in a towing vehicle with a trailer control valve, wherein a trailer control pressure generated in the towing vehicle is transmittable via the trailer control valve to a trailer coupled to the towing vehicle in order to trigger wheel brakes of the trailer as a function of the trailer control pressure, wherein the trailer control pressure for implementing a stretch brake function or an auxiliary brake function is delivered as a function of a setting position of a manually actuatable operating element, the method comprising:

determining a setting position of the operating element;

determining a trailer target pressure as a function of the determined setting position of the operating element;

generating the trailer control pressure corresponding to the trailer target pressure and delivering the trailer control pressure to the trailer control valve;

determining an actual deceleration of the towing vehicle, at least when the stretch brake function is activated;

reading a minimum deceleration for the towing vehicle associated with the determined setting position;

triggering the wheel brakes of the towing vehicle when the actual deceleration falls below the minimum deceleration read such that the trailer control pressure delivered to the trailer control valve does not change and the actual deceleration of the towing vehicle increases; and, wherein the trailer target pressure:

is determined from a first characteristic curve when the stretch brake function is activated in order to implement the stretch brake function when the operating element is actuated, and is determined from a second characteristic curve when the stretch brake function is deactivated in order to implement the auxiliary brake function when the operating element is actuated, wherein the first characteristic curve and the second characteristic curve each associate the trailer target pressure with the setting position of the operating element.

7. The method of claim 1, wherein the stretch brake function and the auxiliary brake function are implemented on actuation of the operating element only when the towing vehicle is moving, and a parking brake function is implemented on actuation of the operating element when the towing vehicle is not moving.

8. The method of claim 7, wherein the parking brake function is implemented by the wheel brakes of the towing vehicle being triggered and actuation of a parking brake valve is suppressed when the stretch brake function is activated.

9. The method of claim 1, wherein the minimum deceleration follows from a third characteristic curve which associates the minimum deceleration with the determined setting position.

10. The method of claim 1, wherein at least one of the setting position of the operating element and an activation of the stretch brake function via a switch is read from a vehicle data bus.

11. The method of claim 1, wherein the wheel brakes of the towing vehicle are triggered when the actual deceleration falls below the minimum deceleration read, such that the actual deceleration of the towing vehicle reaches or exceeds the minimum deceleration.

12. The method of claim 1, wherein the trailer control pressure corresponding to the trailer target pressure is generated in order to implement at least one of the stretch brake function and the auxiliary brake function by an adjusting valve being electrically actuated in an additional line leading to the trailer control valve; and, a supply pressure supplied to the adjusting valve via a valve device from an additional pressure reservoir is modulated by the electrical actuation of the adjusting valve such that the trailer control pressure delivered corresponds to the trailer target pressure.

13. The method of claim 12, wherein the valve device is a 3/2-way valve.

14. The method of claim 12, wherein the adjusting line is electrically actuated via an ABS control device in the towing vehicle.

15. The method of claim 1, wherein the wheel brakes of the towing vehicle are triggered when the actual deceleration falls below the minimum deceleration read, by actuating ABS control valves which are connected upstream of the wheel brakes on at least one of a front axle and a rear axle of the towing vehicle in order to modulate a brake pressure which is supplied to the wheel brakes from pressure reservoirs.

16. The method of claim 15, wherein an actuation-dependent control pressure is provided both for the rear axle of the towing vehicle and for the front axle of the towing vehicle by actuating a brake valve of the anti-lock braking system in the towing vehicle; and, via a valve unit on the rear axle of the towing vehicle and, when the stretch brake function is at least one of deactivated and suppressed, also via a valve unit on the front axle of the towing vehicle, a brake pressure dependent on a respective control pressure is delivered to the wheel brakes on the rear axle and to the wheel brakes on the front axle respectively in the towing vehicle, ABS brake valves being connected upstream of each of the wheel brakes for modulating the delivered brake pressure.

17. The method of claim 7, wherein the parking brake function is implemented by the wheel brakes of the towing vehicle being triggered via a parking brake valve and actuation of the parking brake valve is suppressed when the stretch brake function is activated.

18. An ABS control device for a towing vehicle having an electropneumatic ABS brake system for carrying out the method of claim 1, the ABS control device being configured to:
- determine the setting position of the operating element;
- determine the trailer target pressure as a function of the determined setting position of the operating element;
- output an adjusting valve signal to an adjusting valve such that the trailer control pressure corresponding to the trailer target pressure can be generated and delivered via an additional line to the trailer control valve of the ABS brake system, wherein the trailer control pressure generated can be transmitted via the trailer control valve to the trailer coupled to the towing vehicle in order to trigger the wheel brakes of the trailer to implement the stretch brake function or the auxiliary brake function as a function of the trailer control pressure;
- determine the actual deceleration of the towing vehicle, at least when the stretch brake function is activated;
- read the minimum deceleration for the towing vehicle associated with the determined setting position; and,
- trigger the wheel brakes of the towing vehicle such that the trailer control pressure delivered to the trailer control valve does not change and the actual deceleration of the towing vehicle increases when the actual deceleration falls below the minimum deceleration read.

19. An ABS control device for a towing vehicle having an electropneumatic anti-lock braking system, the ABS control device comprising:
- a non-transitory computer readable storage medium;
- a processor;
- said non-transitory computer readable storage medium having program code stored thereon; said program code being configured, when executed by said processor, to:
  - determine a setting position of an operating element;
  - determine a trailer target pressure as a function of the determined setting position of the operating element;
  - output an adjusting valve signal to an adjusting valve such that a trailer control pressure corresponding to the trailer target pressure can be generated and delivered via an additional line to a trailer control valve of the anti-lock braking system, wherein the trailer control pressure generated can be transmitted via the trailer control valve to a trailer coupled to the towing vehicle in order to trigger wheel brakes of the trailer to implement a stretch brake function or an auxiliary brake function as a function of the trailer control pressure;
  - determine an actual deceleration of the towing vehicle, at least when the stretch brake function is activated;
  - read a minimum deceleration for the towing vehicle associated with the determined setting position; and,
  - trigger wheel brakes of the towing vehicle such that the trailer control pressure delivered to the trailer control valve does not change and the actual deceleration of the towing vehicle increases when the actual deceleration falls below the minimum deceleration read.

20. A towing vehicle comprising:
- an electropneumatic anti-lock braking system;
- an ABS control device of claim 19;
- said electropneumatic anti-lock braking system including the trailer control valve, wherein the trailer control pressure which can be generated in the towing vehicle can be transmitted via the trailer control valve to the trailer coupled to the towing vehicle, to trigger the wheel brakes of the trailer as a function of the trailer control pressure; and,
- wherein the trailer control pressure can be delivered as a function of the setting position of the manually actuatable operating element to implement the stretch brake function or the auxiliary brake function.

\* \* \* \* \*